Oct. 12, 1971  HIROSHI KAJIURA ETAL  3,611,803

IMPACT FLOW METER FOR POWDERY AND GRANULAR MATERIALS

Filed Aug. 28, 1968

INVENTOR
HIROSHI KAJIURA
KINNOSUKE WATANABE
BY Sternberg & Blake
attys

United States Patent Office 3,611,803
Patented Oct. 12, 1971

3,611,803
IMPACT FLOW METER FOR POWDERY AND GRANULAR MATERIALS
Hiroshi Kajiura, 1–5, 2-chome, Higashinakano, Nakano-ku, and Kinnosuke Watanabe, 22–8, 3-chome, Nishio-chiai, Shinjuku-ku, both of Tokyo, Japan
Filed Aug. 28, 1968, Ser. No. 755,983
Int. Cl. G01f 1/12
U.S. Cl. 73—228    3 Claims

ABSTRACT OF THE DISCLOSURE

An impact flow meter for powdery and granular materials characterized in that a stream of powdery or granular material dropping from a certain height is once divided into a plurality of sub-streams and then the sub-streams are merged before dropping with an impact on an impact-receptive detecting plate.

---

This invention relates principally to impact flow meter for powdery and granular materials, and it is a main object of the invention to measure the flow rate of a given powdery or granular material always with a high accuracy regardless of the nature of the material or the fluctuation of discharge.

Figure 1:
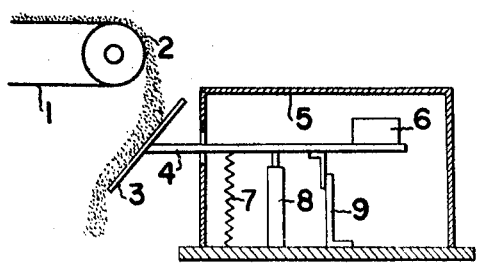
Figure 3:
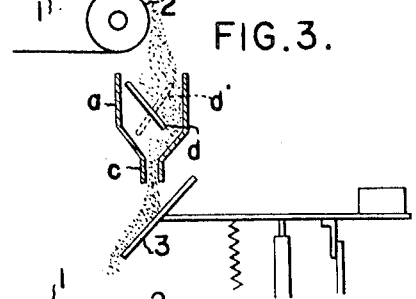

In the accompanying drawings: FIG. 1 is a view explanatory in general of an impact flow meter for powdery and granular materials; and FIGS. 2 to 7 are views illustrating different embodiments of the present invention, FIG. 2 being a diagrammatic view of one embodiment of the meter according to the invention, FIG. 3 is a diagrammatic view of a second embodiment, FIG. 4 a plan view of the essential part of the embodiment shown in FIG. 3, FIG. 5 a diagrammatic view of a third embodiment, FIG. 6 a sectional view of the essential part of another form of the embodiment shown in FIG. 5, and FIG. 7 a diagrammatic view of a fourth embodiment of the invention.

Generally "impact flow meters for powdery and granular materials" is a generic term for the instruments for measuring and indicating the instantaneous flow rate of a powdery or granular material through the determination of a vertical impact load which results from dropping of the subject material from a certain height.

One example of such instruments is shown in FIG. 1. In the flow meter of this type, a powdery or granular material 2 is allowed to drop from a conveyor 1 or hopper onto a chute or impact-receptive detecting plate 3 thereby producing an impact load proportional to the flow rate. The load is balanced with the reaction force of a spring 7 through a beam 4. Of course this beam is equipped with a weight 6 and a supporter 9 so that, in the absence of any impact load, the beam can be kept in a horizontal position with the aid of the supporter 9. When the beam is displaced by the vertical impact to which the impact-receptive detecting plate 3 is subjected, the displacement is converted into an electrical value by a differential transformer 8 and is indicated as such. It is naturally important that the powdery or granular material be dropped always from a predetermined height onto a predetermined point of the impact-receptive detecting plate 3. For this purpose the instrument itself must be accurately installed in a position a certain distance below the dropping point or the turning point of the conveyor 1 and a rectifying means must be provided to control the flow of the powdery or granular material 2. These requirements may be itemized as follows:

(1) The powdery or granular material must always be let fall in a state of natural drop under identical conditions.

(2) Whatever the flow rate, the material must be allowed to drop naturally onto the one and same predetermined point of the impact-receptive detecting plate.

Considering the condition (2) above, it is appreciated that, with a conventional instrument using a belt conveyor, the point of natural drop varies with the flow rate because the moving conveyor which carries the powdery or granular material imparts a certain horizontal momentum to the material before the latter is dropped. Hence an error is likely in the measured value.

The present invention is directed to complete satisfaction of these requirements.

This object of the invention is realized by an arrangement in which a stream of powdery or granular material dropping from a certain height is once divided into a plurality of sub-streams and then the sub-streams are merged before dropping with an impact on an impact-receptive detecting plate.

Description will now be made in more detail of the present invention with reference to the accompanying drawings showing four different embodiments thereof. The first embodiment shown in FIG. 2 comprises a hopper $a$ located close to the dropping end of a conveyor for feeding a powdery or granular material, and a baffle or dividing plate $b$ of an inverted V-shaped section disposed in the center of the mouth of said hopper for dividing the dropping material into two sub-streams, said hopper being reduced in diameter on the lower part to a funnel-like shape thereby defining an outlet $c$ for the merged stream of material.

In this embodiment, the powdery or granular material fed into the hopper $a$ is divided by the dividing plate $b$ sidewise into sub-streams, which in turn are merged through the outlet $c$ before dropping onto the impact-receptive detecting plate (as indicated at 3 in FIG. 1). By disposing the ridge of the dividing plate $b$ immediately beneath the conveyor 1 and in the center of the width of the stream of material on the conveyor, it is possible to divide the stream of dropping particles completely sidewise into two sub-streams of equal quantities. Further, because the sub-streams are merged at the outlet $c$ and the merged stream in a state of natural drop hits against the impact-receiving plate, the dropping point on the receiving plate is kept unchanged regardless of any fluctuation in the flow rate of the material. Thus, all of those conditions above pointed out can be completely satisfied.

The second embodiment shown in FIG. 3 comprises a hopper $a$ located close to the dropping end of a conveyor for feeding a powdery or granular material, and a suitable number of pairs of equidistantly spaced and alternately and symmetrically inclined dividing plates, $d$, $d'$, said hopper being provided with a merging outlet $c$ immediately beneath the plurality of dividing plates.

In this embodiment, the powdery or granular material 2 thrown into the hopper $a$ is divided sidewise into two exactly equal sub-streams by the pairs of inclined plates $d$, $d'$ in the respective compartments of the hopper, and the sub-streams of the particles are then put together at the outlet $c$ and let fall in the state of natural drop onto the impact plate. Since the compartments are same in volume, the instantaneous contents of the powdery or granular material in the respective compartments are same, which are then merged as they pass through the outlet $c$. Therefore, it is again possible with this embodiment that the dropping point on the impact-receptive detecting plate 3 can be kept constant in disregard of any fluctuation in the flow rate of dropping particles and thus the abovementioned requirements can be met satisfactorily.

Figure 5:
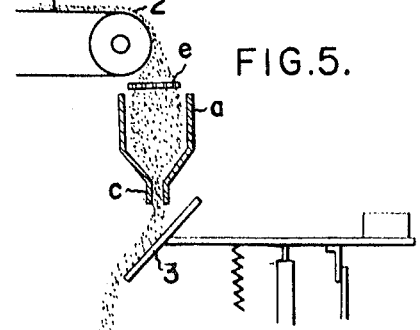

The third embodiment shown in FIG. 5 comprises a hopper $a$ located close to the dropping end of a conveyor for feeding a powdery or granular material and a screen $e$ of a contour corresponding to the shape of the hopper *a* and which is disposed in the cylindrical, large-diameter portion of the hopper *a*, said hopper being provided with a merging outlet *c* of a reduced diameter immediately below said screen.

Figure 6:
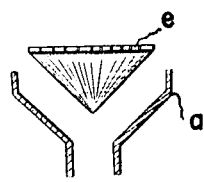

Thus, in this embodiment, the powdery or granular material 2 thrown into the hopper *a* is once received by the screen *e* disposed in the cylindrical, large-diameter portion of the hopper, dropped only by gravitational force therethrough and via the merging outlet *c* and is dropped in a state of natural drop onto a predetermined point of the impact-receptive detecting plate 3. Consequently, this embodiment can meet all of the above-mentioned requirements, and accurate measurement of the flow rate is made possible independently of fluctuation in the discharge. The screen may be of any desired configuration, e.g., flat plate or conical (as shown in FIG. 6), depending on the shape of the hopper *a* on which it is disposed.

Figure 7:
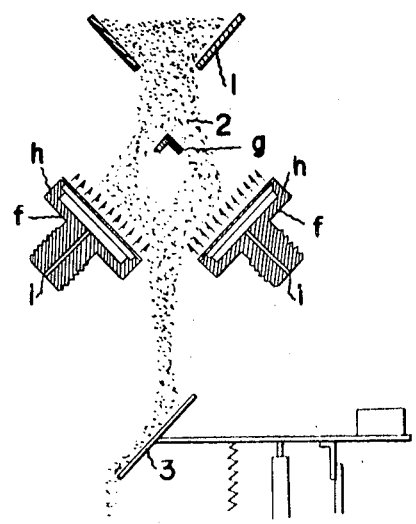
Figure 2:
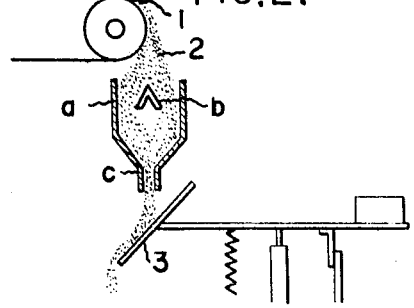

Lastly, the fourth embodiment shown in FIG. 7 comprises a divider for dividing the stream of a dropping powdery or granular material sidewise, and receiving blocks covered with a suitable permeable membrane for receiving the sub-streams, said blocks being adapted to supply compressed air from the rear part thereof to the sub-streams of the dropping particles thereby permitting the merged stream of particles to drop with an impact on the impact-receptive detecting plate.

To be more specific, this embodiment comprises an inverted V-shaped divider immediately below a hopper 1 or the like and a pair of receiving blocks *f, f* provided substantially in V-shaped arrangement but spaced apart in a horizontal and symmetrical relationship, said receiving blocks having one sheet each of cloth *h, h* such as asbestos cloth which is suitable for passing compressed air, stretched to cover each board surface, said boards being provided with passages *i, i* for compressed air on the rear parts thereof, so that the stream of powdery or granular material 2 being fed down through the hopper can be divided sidewise by the divider *g* into two substreams, and while the sub-streams are received by the asbestos cloth *h, h* of receiving blocks *f, f*, compressed air is blown against the sub-streams from the rear parts of the blocks thereby to merge the sub-streams therebetween and drop the merged stream of particles with an impact onto a predetermined point of the impact-receptive detecting plate 3. With such arrangement, the various requirements for measurement can be met with as much accuracy as by the other embodiments thus far described.

Figure 4:
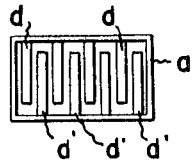

It is apparent that with all embodiments of the invention, the supply means which supplies the granular material, delivers this latter material to a passage-forming means which defines individual passages which are spaced from each other and along which the granular material drops in the form of subsidiary streams respectively flowing along these individual passages. Thus, in the case of FIGS. 2 and 7 it is the elongated baffle of inverted V-shaped configuration which provides the oppositely inclined flat plate portions onto which the particulate material drops with these portions defining the pair of individual passages on opposite sides of the lower edges of the baffles *b* and *g*, so that in this case a pair of individual subsidiary streams, which initially are spaced from each other, are formed by the baffle which constitutes the passage-defining means of these embodiments. In the case of FIGS. 3 and 4, the oppositely inclined series of plates *d* and *d'* respectively direct portions of the material first in one direction and then in the opposite direction to define also in this case individual passages down which subsidiary streams of the particulate material will necessarily fall. In the case of FIGS. 5 and 6, of course the wires or rods which define the mesh of the screen *e* will define passages in the form of openings separated from each other by these wires and forming the individual spaced passages along which subsidiary streams of particulate material will necessarily fall.

Also, with all of the embodiments the several subsidiary streams of particulate material are reunited and merged together before leaving the common outlet *c* from which they drop onto the predetermined point of the impact plate 3. Of course in the case of FIG. 7 it is the space between the elements *f* which defines the outlet through which the reunited streams drop in a precise manner onto a predetermined location of the impact plate 3. With this construction irrespective of variations in the characteristic of the flow of the particulate material as it leaves the supply means 1, the subsidiary streams into which the particulate material is subdivided by the passage-defining means will eliminate the influence of such irregularities and when the streams are reunited they will flow in precisely the same way onto the impact plate, avoiding any inaccuracies which might result if the variations at the supply means were permitted to influence the falling of the particulate material onto the impact plate.

While the embodiments enumerated hereinabove can all realize the object of the present invention, it is to be noted that numerous other modifications are possible without departing from the spirit and scope of the invention.

In the accompanying drawings, like reference numerals are used to designate like parts for the convenience of illustration.

What is claimed is:

1. In an impact flow meter for powdery, granular materials, supply means for supplying the material to a predetermined location from which the material falls, passage-defining means situated in the path of falling movement of the material supplied by said supply means and defining individual passages which are spaced from each other and along which said passage-defining means compels the falling material to flow so that the falling material is subdivided into a plurality of subsidiary streams which continue to fall, means situated along the path of falling movement of the subsidiary streams for reuniting the latter again into a single stream without interrupting the falling movement thereof, and an impact plate situated in the path of falling movement of the reunited streams so that the material thereof will impinge on said plate, whereby any irregular variable influences on the falling material derived from said supply means will be prevented from exerting any influence on the manner in which the particulate material impinges on said plate, said passage-defining means being in the form of a series of baffle plates each of which is oppositely inclined with the respect to the next preceding and the next following baffle plate so that the series of baffle plates direct the falling material in opposed directions and in the form of individual subsidiary streams along the passages defined by said plates.

2. The combination of claim 1 and wherein said series of baffle plates are uniformly spaced and equally inclined with the alternating plates being identical and symmetrically arranged with respect to the remaining plates.

3. In an impact flow meter for powdery, granular materials, supply means for supplying the material to a predetermined location from which the material falls, passage-defining means situated in the path of falling movement of the material supplied by said supply means and defining individual passages which are spaced from each other and along which said passage-defining means compels the falling material to flow so that the falling material is subdivided into a plurality of subsidiary streams which continue to fall, means situated along the path of falling movement of the subsidiary streams for reuniting the latter again into a single stream without interrupting the falling movement thereof, and an impact plate situated in the path of falling movement of the reunited streams so that the material thereof will impinge on said plate, whereby any irregular variable influences on the falling material derived from said supply means will be prevented from exerting any influence on the manner in which the particulate material impinges on said plate, said means for reuniting the subsidiary streams including a pair of oppositely inclined porous sheets directed upwardly toward said streams and having lower edges which define between themselves the passage through which the reunited streams flow onto the impact plate, and means for directing compressed air through the porous sheets for deflecting the material from the subsidiary streams into the reunited stream.

References Cited

UNITED STATES PATENTS

| | | | |
|---|---|---|---|
| 3,212,330 | 10/1965 | Pollier | 73—228 |
| 3,232,486 | 2/1966 | Ofner | 222—55 |
| 3,269,181 | 8/1966 | Seay | 73—228 |

RICHARD C. QUEISSER, Primary Examiner

M. SMOLLAR, Assistant Examiner